United States Patent [19]

Ohno

[11] Patent Number: 4,471,272
[45] Date of Patent: Sep. 11, 1984

[54] CIRCUIT FOR CONTROLLING THE SPEEDS OF TWO CAPSTANS

[75] Inventor: Hirotoshi Ohno, Yokohama, Japan

[73] Assignee: Victor Company of Japan, Limited, Yokohama, Japan

[21] Appl. No.: 309,701

[22] Filed: Oct. 1, 1981

[30] Foreign Application Priority Data

Oct. 2, 1980 [JP] Japan .................. 55-137954

[51] Int. Cl.$^3$ ............................................. B65H 59/38
[52] U.S. Cl. ........................................... 318/7; 318/6; 318/398
[58] Field of Search ........................ 318/6, 7, 397, 398, 318/603; 242/75.44, 75.51, 75.52, 203; 360/73; 307/269; 328/62; 226/25, 111, 178, 181

[56] References Cited

U.S. PATENT DOCUMENTS

| | | | |
|---|---|---|---|
| 3,329,876 | 7/1967 | Branco ..................... | 318/7 |
| 3,861,573 | 1/1975 | Kawasaki et al. ............ | 318/7 X |
| 3,982,160 | 9/1976 | Goldschmidt et al. ......... | 318/7 |
| 4,160,195 | 7/1979 | Sakamoto ................... | 318/7 |
| 4,321,515 | 3/1982 | Honda ...................... | 318/7 X |
| 4,321,687 | 3/1982 | Parsons et al. .............. | 328/62 X |

OTHER PUBLICATIONS

J. D. Mitchell, et al., "Magnetic Tape Unit Capstan Servomechanism", IBM Technical Disclosure Bulletin, vol. 15, No. 10, Mar. 1973, pp. 2988-2990.

*Primary Examiner*—Ulysses Weldon
*Attorney, Agent, or Firm*—Lowe, King, Price & Becker

[57] ABSTRACT

The speeds of two capstans of a dual capstan type tape recorder are individually controlled by respectively associated first and second phase locked loops. Each phase locked loop includes a speed detector for generating pulses at a frequency corresponding to the rotational speed of the associated capstan, a phase detector receptive of the pulses and a motor for driving the associated capstan in response to the output of the phase detector. A reference frequency oscillator supplies a constant frequency signal to a first frequency divider and to a second, programmable frequency divider which are respectively associated with the first and second phase locked loops. The first and second frequency dividers feed their outputs to the phase detectors of the first and second phase locked loops, respectively, to allow phase comparison with the received pulse to control the associated motors. The programmable frequency divider is controlled by a preset input to vary its frequency division ratio so that the speed of the capstan on the supply reel side is driven at a speed slight lower than the speed of the other capstan to maintain the recording tape between them under taut condition.

11 Claims, 3 Drawing Figures

CIRCUIT FOR CONTROLLING THE SPEEDS OF TWO CAPSTANS

BACKGROUND OF THE INVENTION

The present invention relates generally to tape speed control systems for tape recorders, and more particularly to a circuit for controlling the speeds of two capstans of a cassette tape recorder of the dual capstan type so that the recording tape is transported under appropriately taut condition.

In conventional dual capstan type cassette tape recorders, the capstans are respectively located adjacent takeup and supply reels. To each of the capstans is coupled a wheel around which is supported a rubber belt so that the capstans are coupled together for unitary rotation by a single motor connected to the capstan located on the takeup reel side. A tape recorder of this type utilizes the elasticity of the rubber belt to rotate the supply-reel side capstan with a slip friction so that the latter is driven at a speed approximately 0.1% to 0.2% lower than the speed of rotation of the takeup-reel side capstan to maintain the recording tape between the capstans under taut condition.

However, the physical properties of the rubber belt tend to vary with time. Due to the delicate adjustment needed to maintain the specified speed relationship, conventional dual capstan tape recorders are not satisfactory for long use.

SUMMARY OF THE INVENTION

The present invention obviates the problem by individually driving the capstans through respective phase lock loops which are in turn controlled by respective frequency dividers. At least one of the frequency dividers is of a programmable or presettable type which allows the ratio of frequency division to vary according to a signal applied to its preset input. A control signal is applied to the digital preset input of the programmable frequency divider so that the speed of the capstan on the supply reel side rotates at a speed which is slightly lower than the speed of the takeup reel side capstan, whereby the recording tape is slightly pulled by the takeupon reel side capstan so that a taut condition is maintained.

Specifically, the capstan control circuit of the invention comprises an oscillator for generating a constant frequency signal, a first frequency divider coupled to the oscillator for dividing the frequency of the constant frequency signal by an integer, a second or programmable frequency divider coupled to the oscillator for dividing the frequency of the constant frequency signal by a variable integer in response to a digital control signal, and first and second phase locked loops respectively associated with the first and second frequency dividers and further associated with the first and second capstans to energize the first and second motors respectively. Each of the phase locked loops includes a speed detector for generating pulses at a frequency corresponding to the rotational speed of the associated capstan and a phase detector for detecting the phase deviation of the pulses with respect to the output of the associated frequency divider for controlling the speed of the associated motor.

BRIEF DESCRIPTION OF THE DRAWINGS

The invention will be described in further detail with reference to the accompanying drawings, in which.

DETAILED DESCRIPTION

Figure 1:
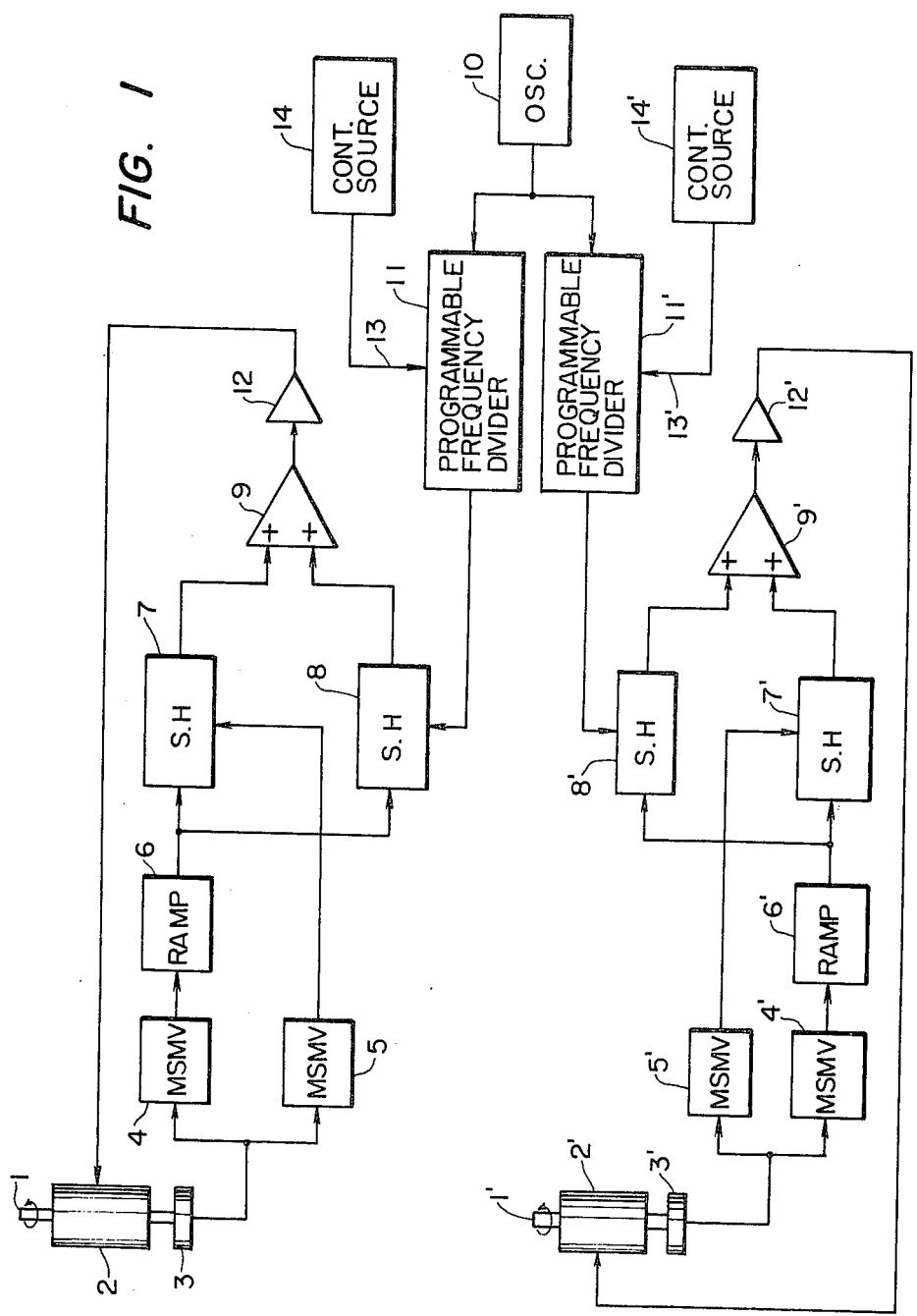
FIG. 1 is a block diagram of an embodiment of the capstan speed control circuit of the present invention.

A tape drive system according to the present invention, as illustrated in FIG. 1, comprises first and second capstan drive motors 2, 2' respectively driving capstans 1 and 1' which are located adjacent the takeup and supply reels, respectively, of a cassette tape recorder of the dual capstan type. The capstans 1 and 1' are arranged to engage respective pinch rollers, not shown, to transport a recording tape between the supply and takeup reels. The rotational speeds of the capstan drive motors 2, 2' are detected by first and second speed detectors 3, 3', respectively, each of which generates a train of rectangular pulses at a frequency proportional to the speed of rotation of each motor.

The speed related pulses from the first detector 3 are applied to first and second monostable multivibrators 4 and 5. The first monostable multivibrator 4 is arranged to detect the leading edge of each speed pulse and triggers a ramp generator 6 to generate a ramp voltage which is applied to first and second sample-and-hold circuits 7 and 8. The second monostable multivibrator 5 is arranged to detect the trailing edge of each rectangular pulse to generate a sampling pulse for the sample-and-hold circuit 7, so that the instantaneous value of the ramp voltage is sampled and applied to an input of adder 9. Since the duration of the rectangular pulse generated by the speed detector 3 varies inversely as a function of the rotational speed of the motor 2, the output of the adder 9 varies as an inverse function of the rotational speed of the takeup-side capstan 1.

The system includes a quartz, i.e., electronic oscillator 10 which supplies a reference frequency pulse to programmable, or variable frequency dividers 11 and 11'. The output frequency of the variable frequency divider 11 is a first integral submultiple of the reference frequency, this integral submultiple is a frequency division ratio determined by a first frequency control digital signal applied to a terminal 13 from a first frequency control source 14. The output signal of the frequency divider 11 is therefore a manually adjustable reference frequency signal which is used as a sampling pulse for the second sample-and-hold circuit 8 so that it generates an output voltage representative of the phase deviation of the speed related pulse with respect to this reference signal. The phase deviation signal from the second sample-and-hold circuit 8 is applied to another input of the adder 9 to be summed with the output of the first sample-and-hold circuit 7. Therefore, the output of the adder 9 is also a function of the phase difference, this output being coupled to amplifier 12, and thence fed to the first capstan drive motor 2 so that the takeup-side capstan 1 is driven at a speed variable as a function of the frequency and phase of the first variable frequency divider 11 and hence as a function of the control signal supplied from the source 14.

When the takeup-side capstan 1 is first energized at standstill, a relatively large voltage is developed at the output of the sample-and-hold circuit 7 to accelerate the motor 2 until it attains a given speed. When this speed is reached, the sample-and-hold circuit 8 comes into play developing a phase deviation signal with respect to the standard phase provided by the frequency divider 11, so that the takeup-side capstan 1 is driven at a speed determined by the control source 14. Under this condition, a change in the first frequency control signal from source 14 results in a variation in the output of the sample-and-hold circuit 8 which causes the capstan 1 to rotate at a different speed. If the change in frequency control signal is in a direction toward increasing the capstan speed, the voltage sampled by the phase detector sample-and-hold circuit 8 increases to cause the capstan 1 to rotate at a higher speed. This process continues until the capstan 1 attains a new steady state which is thereafter maintained constant by the negative feedback action provided by the output of the sample-and-hold circuit 7.

In a similar manner, the output from the second speed detector 3' is applied to a pair of third and fourth monostable multivibrators 4' and 5' having the same functions as the first and second monostable multivibrators 4 and 5, respectively, so that a second ramp generator 6' is triggered in response to the leading edge of the speed signal from the second speed detector 3'. The output of the second ramp generator 6' is applied to a pair of third and fourth sample-and-hold circuits 7' and 8'. The third sample-and-hold circuit 7' is sampled in response to the trailing edge of the speed pulse from the second detector 3' and applied to a second adder 9' to which is also supplied a sampled output of the fourth sample-and-hold circuit 8'. The fourth sample-and-hold circuit 8' is sampled by the output of the variable frequency divider 11' at a frequency which is a second integral submultiple of the oscillator frequency. This integral submultiple is a frequency division ratio determined by a second frequency control signal applied to a terminal 13' from a second frequency control source 14'. The output of the adder 9' is amplified at 12' and fed to the second capstan driver motor 2' so that the supply-side capstan is driven at a speed as a function of the control signal applied from the second source 14'.

By appropriately adjusting the frequency control signals relative to each other, it is seen that the supply-side capstan 1' can be driven at a desired speed which is constantly lower by a predetermined amount than the rotational speed of the takeup-side capstan 1, so that the magnetic tape transported between them during playback or recording mode is kept under taut condition.

Figure 2:
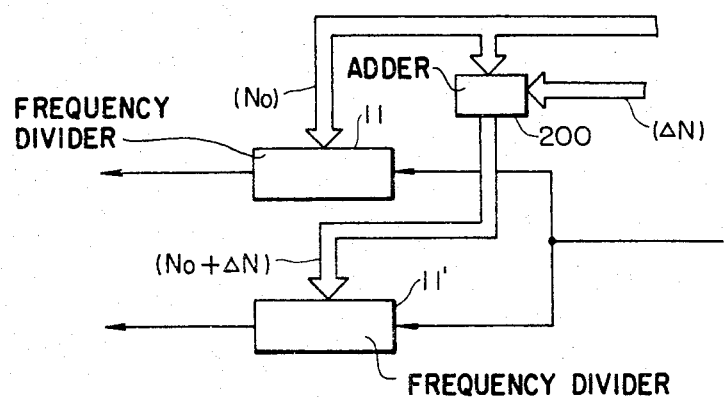
FIG. 2 is a modified embodiment of the frequency dividers of FIG. 1.

FIG. 2 is a modified embodiment of the invention in which a digital adder 200 is further included to sum up a digital preset input No to the frequency divider 11 with a digital speed adjustment control input ΔN which represents the difference in speed between the two capstans. The adder 200 provides its summed output No+ΔN to the preset input of the frequency divider 11' to decrease the output frequency of the frequency divider 11'. Thus, the supply-side capstan 11' is driven at a lower speed than the takeup-side capstan 1 by an amount corresponding to ΔN.

Figure 3:
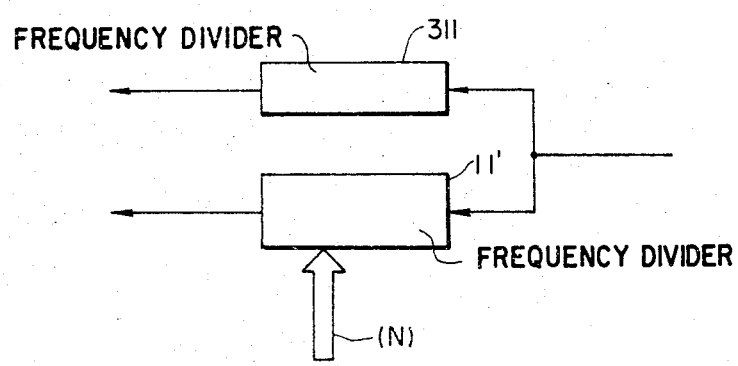
FIG. 3 is a further modification of the frequency dividers of FIG. 1.

A further modification, shown in FIG. 3, differs from FIG. 1 in that it employs a frequency divider 311 of a constant division type instead of the variable frequency divider 11 so that the takeup-side capstan 1 turns at a preset speed. The speed control input is applied only to the programmable divider 11'.

The embodiments shown in FIGS. 2 and 3 have the benefit of reducing the number of connector pins when the circuitry is constructed on an integrated circuit pattern.

What is claimed is:

1. A circuit arrangement for controlling the speed of at least one of first and second capstans respectively located adjacent takeup and supply reels of a tape recording and/or reproducing apparatus, wherein said capstans are driven by first and second motors respectively to transport a recording tape between said reels so that the tape is driven at a constant speed and maintained taut between said first and second capstans, comprising:

a single oscillator for generating a constant frequency signal;

a first frequency divider coupled to said oscillator for dividing the frequency of said signal by an integer;

a second, programmable frequency divider coupled to said oscillator for dividing the frequency of said signal by a variable integer in response to a digital control signal applied thereto; and first and second loops respectively controlling the speed of the first and second motors, the first and second loops being respectively associated with said first and second frequency dividers and further associated with said first and second capstans to energize said first and second motors respectively, each of said loops including: first means for generating a first signal having a frequency synchronized with the rotational speed of the associated capstan, second means for generating a second signal having an amplitude inversely proportional to the rotational speed of the associated capstan and third means for generating a third signal having an amplitude proportional to the difference in phase between said first signal and the output of the associated frequency divider, said second and third signals being combined and applied to the associated motor.

2. A circuit arrangement as claimed in claim 1, wherein said first frequency divider comprises a programmable frequency divider for dividing said constant frequency signal by a variable integer in response to a control signal to control the speed of said first motor in relation to said second motor.

3. A circuit arrangement as claimed in claim 2, further comprising a digital adder for summing said control signal supplied to said first programmable frequency divider with a speed adjustment control signal and applying the summed output to said second programmable frequency divider.

4. A circuit arrangement as claimed in claim 1, 2, or 3, wherein said second and third means of each of said loops comprises:

a ramp generator for generating a ramp voltage in response to a leading edge transition of said first signal;

first and second sample-and-hold circuits, said first sample-and-hold circuits being responsive to a trailing edge transition of said first signal for sampling said ramp voltage, said second sample-and-hold circuit being responsive to the output of the associated frequency divider for sampling said ramp voltage; and an adder for summing the voltages sampled by said first and second sample-and-hold circuits for application to the associated motor.

5. Apparatus for controlling the speed of magnetic tape so the tape is maintained taut between first and second tape driving capstans comprising first and second motors having first and second shafts for respectively driving the first and second capstans, first and second transducers responsive to the speeds of the first and second shafts for deriving first and second signals respectively having first and second frequencies with transitions synchronized with the rotations of the first and second shafts, an oscillator for deriving a wave having a reference frequency, manually programmable frequency divider means responsive to the reference frequency wave for deriving first and second waves having first and second frequencies, said first and second frequencies being integral sub-multiples of the reference frequency, said integral sub-multiples being manually adjustable independently of each other, first comparator means responsive to the first wave and first signal for controlling the speed of the first motor as a function of the relative frequency and phase of the first wave and first signal, and second comparator means responsive to the second wave and second signal for controlling the speed of the second motor as a function of the relative frequency and phase of the second wave and second signal.

6. The apparatus of claim 5 wherein the first control means includes means for instigating a first ramp in response to a first predetermined transition of the first signal, means for sampling the first ramp in response to a second predetermined transition of the first signal to derive a third signal having an amplitude indicative of the frequency of the first signal, means for sampling the amplitude of the first ramp in response to a predetermined transition of the first wave to derive a fourth signal having an amplitude indicative of the relative frequencies and phases of the first signal and first wave, and means for linearly combining the third and fourth signals to derive a control signal for the speed of the first motor, the second control means including means for instigating a second ramp in response to a first predetermined transition of the second signal, means for sampling the second ramp in response to a second predetermined transition of the second signal to derive a fifth signal having an amplitude indicative of the frequency of the second signal, means for sampling the amplitude of the second ramp in response to a predetermined transition of the second wave to drive a sixth signal having an amplitude indicative of the relative frequencies and phases of the second signal and second wave, and means for linearly combining the fifth and sixth signals to derive a control signal for the speed of the second motor.

7. The apparatus of claim 5 wherein the first control means includes means responsive to the first signal for deriving a third signal having a value indicative of the frequency of the first signal, means responsive to the first signal and first wave for deriving a fourth signal having a value indicative of the relative frequency and phase of the first signal and first wave, means for linearly combining the values of the third and fourth signals to derive a control signal for the speed of the first motor, the second control means including means responsive to the second signal for deriving a fifth signal having a value indicative of the frequency of the second signal, means responsive to the second signal and second wave for deriving a sixth signal having a value indicative of the relative frequency and phase of the second signal and second wave, means for linearly combining the values of the fifth and sixth signals to derive a control signal for the speed of the second motor.

8. A circuit arrangement for controlling the speed of at least one of first and second capstans respectively located adjacent takeup and supply reels of a tape recording and/or reproducing apparatus, wherein said capstans respectively are driven by first and second motors to transport a recording tape between said reels so that the tape is driven at a constant speed and maintained taut between said first and second capstans, comprising:

a single oscillator for generating a constant frequency signal;

a first frequency divider coupled to said oscillator for dividing the frequency of said signal by an integer;

a second, programmable frequency divider coupled to said oscillator for dividing the frequency of said signal by a variable integer in response to a digital control signal applied thereto; and first and second loops respectively controlling the speed of the first and second motors, the first and second loops being respectively associated with said first and second frequency dividers and further associated with said first and second capstans to energize said first and second motors respectively, each of said loops including: first means for generating a first signal having a frequency synchronized with the rotational speed of the associated capstan, second means for generating a second signal having an amplitude inversely proportional to the rotational speed of the associated capstan, and third means for generating a third signal having an amplitude proportional to the difference in phase between said first signal and the output of the associated frequency divider, means for linearly combining the amplitude of said second and third signals to derive a combined signal, and means for controlling the speed of the associated motor in response to the amplitude of the combined signal.

9. A circuit arrangement as claimed in claim 8, wherein said first frequency divider comprises a programmable frequency divider for dividing said constant frequency signal by a variable integer in response to a control signal to control the speed of said first motor in relation to said second motor.

10. A circuit arrangement as claimed in claim 9, further comprising a digital adder for summing said control signal supplied to said first programmable frequency divider with a speed adjustment control signal and applying the summed output to said second programmable frequency divider.

11. A circuit arrangement as claimed in claim 8 wherein said second and third means of each of said loops comprises:

a ramp generator for generating a ramp voltage in response to a leading edge transition of said first signal first and second sample-and-hold circuits, said first sample-and-hold circuits being responsive to a trailing edge transition of said first signal for sampling said ramp voltage, said second sample-and-hold circuit being responsive to the output of the associated frequency divider for sample said ramp voltage; and an adder for summing the voltages sampled by said first and second sample-and-hold circuits for application to the associated motor.

* * * * *